W. T. DE VLAMING.
CASTER.
APPLICATION FILED JUNE 20, 1911.

1,012,228. Patented Dec. 19, 1911.

Witnesses
Inventor
Wm T. de Vlaming,
By Harry Ellis Chandler
Attorney

UNITED STATES PATENT OFFICE.

WILLIAM T. DE VLAMING, OF ROANOKE, VIRGINIA.

CASTER.

1,012,228.   Specification of Letters Patent.   Patented Dec. 19, 1911.

Application filed June 20, 1911.   Serial No. 634,340.

*To all whom it may concern:*

Be it known that I, WILLIAM T. DE VLAMING, a citizen of the United States, residing at Roanoke, in the county of Roanoke and State of Virginia, have invented certain new and useful Improvements in Casters, of which the following is a specification.

This invention relates to casters and more particularly to bed casters, and has for its object to provide a caster which will be simple in construction and arrangement and which will include an arrangement of rollers tending to reduce the friction to a minimum.

Another object is to provide a caster including a spring arrangement imparting resiliency to the bed and absorbing the shock incident to rolling the bed over uneven floors, an arrangement being especially provided for the adjustment of the tension of this spring.

Another object is to provide a caster including means for holding it in position in the leg.

Other objects will be apparent from the following description.

Figure 1:
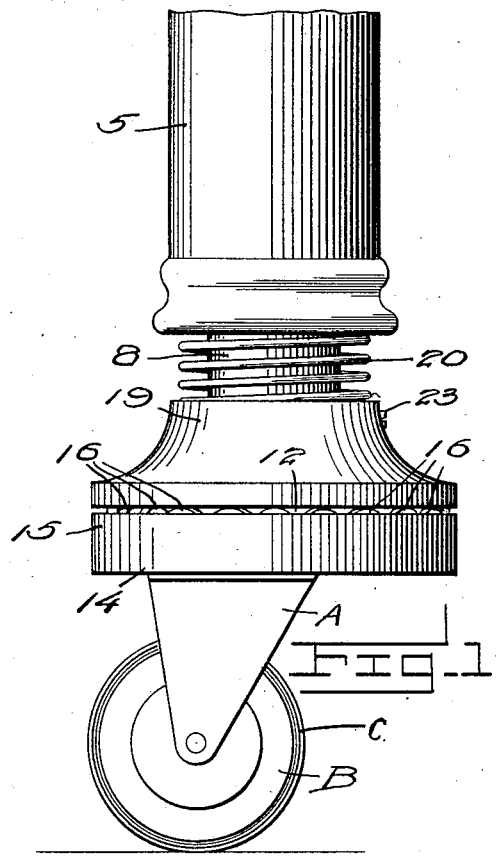
Figure 2:
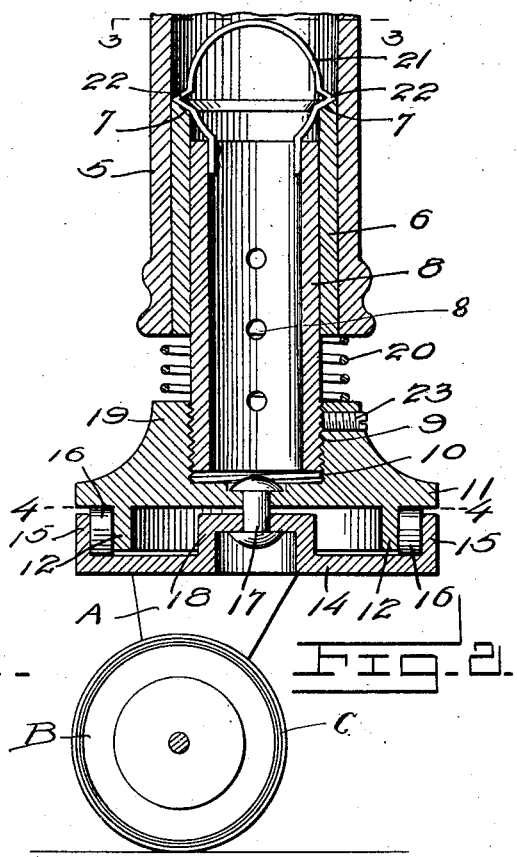
Figure 3:
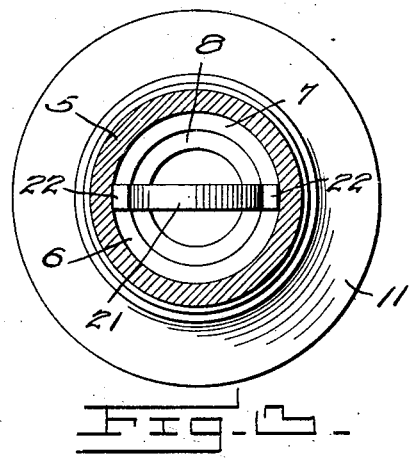
Figure 4:
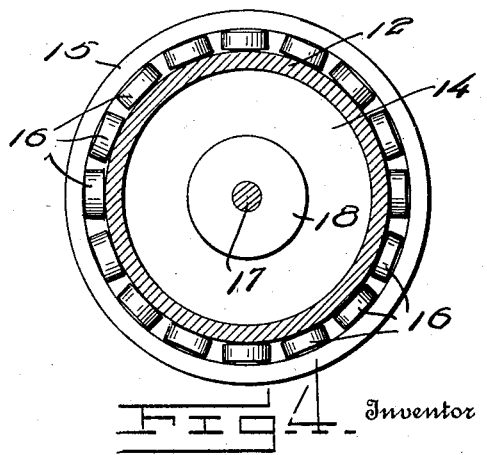

In the drawings: Figure 1 shows an enlarged view of a portion of the leg with the present caster applied thereto. Fig. 2 a longitudinal section through the bed leg and caster. Fig. 3 is a transverse section through the bed leg on line 3—3 of Fig. 2. Fig. 4 is a section on the line 4—4 of Fig. 3.

Referring now to the drawings there is shown a tubular leg 5 having a cylindrical bushing 6 therein which terminates at its upper end in a downwardly and inwardly slanted shoulder.

A hollow cylindrical stock 8 for the caster is provided, and this stock has an exteriorly threaded lower end 9 as shown, which is received in an interiorly threaded socket 10 formed in a circular plate 11 which has a circular depending flange 12 upon its under face and spaced from its outer periphery. A second circular plate 14 is located beneath the plate 11 and has an upwardly extending flange at its outer periphery indicated at 15. Rollers 16 are engaged between the two flanges, and receive the two plates thereagainst. A pivot rivet 17 is engaged in the plate 14, which has an upwardly extending hollow boss 18 at its center and this rivet is also engaged in the plate 11, being accessible through the threaded socket 10, when the stock is removed. The plate 11 has an upwardly extending boss 19 thereon in which the socket is formed and which surrounds the stock 8, as shown.

A helical spring 20 surrounds the stock 8 and is disposed between the inner ends of the leg 5 and the boss 19. It will be seen that this spring acts as a cushion while permitting of some vertical movement of the bed leg 5 when the bed is rolled over an uneven surface. By reason of the bushing 6 a proper bearing surface for the upper end of the spring is obtained.

Means is provided for holding the stock 8 in the bed leg. This consists of a yoke spring 21 secured at its ends within the stock and extending thereabove. The sides of the spring are bowed outwardly beyond the stock and have abruptly bent projections 22 formed therein which extend beyond the upper end of the bushing 6 for engagement of the shoulder 7. The engagement of these projections with the shoulder 7 prevents disengagement of the caster from the leg, while permitting upward movement of the stock 8 against action of the spring 20. As will be seen, the tension of the spring may be varied by adjustment of the stock in the socket 10, a set screw 23 being provided to hold the stock at different points of its adjustment.

The member 14 forms a part of the caster member which includes also the usual yoke A and a roller B. The roller B is provided with a rubber tire C.

The stock 8 is provided with a plurality of openings 8′ with which may be engaged a suitable instrument to aid in withdrawing the stock when desired.

What is claimed is:

1. The combination with a tubular leg having a cylindrical bushing therewithin terminating at its upper end with a beveled shoulder, of a stock engaged within the bushing, a yoke spring secured to the upper end of the stock and having lateral members projecting over the shoulder of the bushing, said stock having a threaded lower end, a member having an interiorly threaded socket engaged with the stock, said member having a shoulder surrounding the socket, a helical spring engaged within the shoulder and the bed leg and bushing, a revoluble caster member connected with the first member, rollers interposed between the two members, and means for holding the second member in position.

2. The combination with a tubular leg and a cylindrical bushing therewithin terminating at its upper end in a beveled shoulder, of a cylindrical hollow stock engaged within the bushing, a yoke spring secured at its ends within the upper end of the stock, said yoke spring having laterally bent portions extending over the shoulder of the bushing, said stock having an exteriorly threaded lower end, a member having an interiorly threaded socket engaged with the stock and having a shoulder surrounding the socket, a helical spring engaged around the stock between the shoulder and the tubular leg and bushing, said socketed member being adjustable upon the stock to vary the tension of the spring, means for holding the socketed member against movement upon the stock, said socketed member having an opening therethrough communicating with the socket, a rivet engaged in the opening, a revoluble caster member engaged with rivet below the first named member, and antifriction devices located between the two members.

In testimony whereof I affix my signature, in the presence of two witnesses.

WILLIAM T. DE VLAMING.

Witnesses:
C. C. TILMAN,
L. E. DE VLAMING.

Copies of this patent may be obtained for five cents each, by addressing the "Commissioner of Patents, Washington, D. C."